March 14, 1967     F. H. PECK     3,308,905
COLLAPSIBLE STEP
Filed Aug. 9, 1965
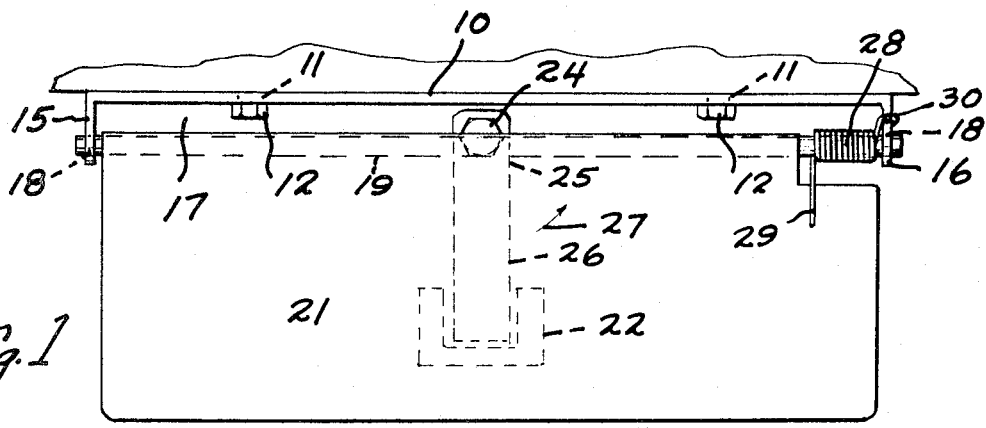
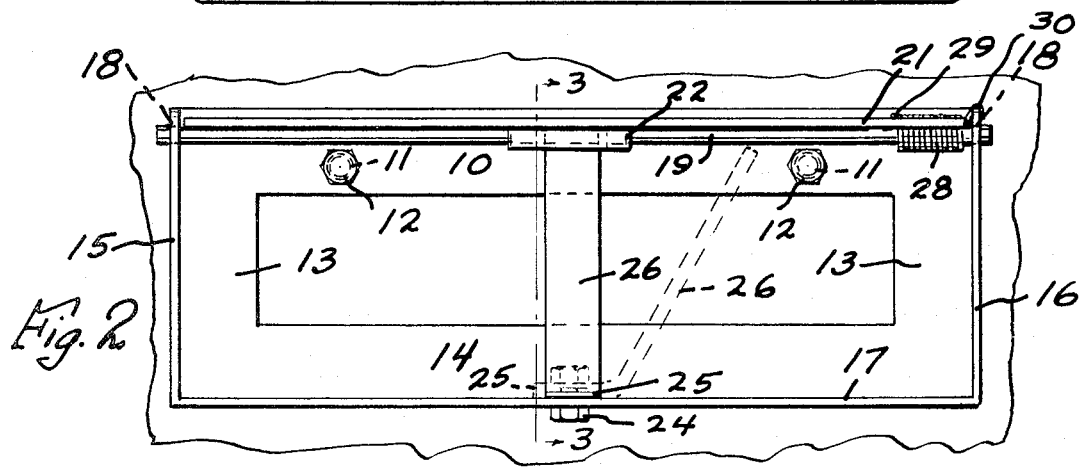
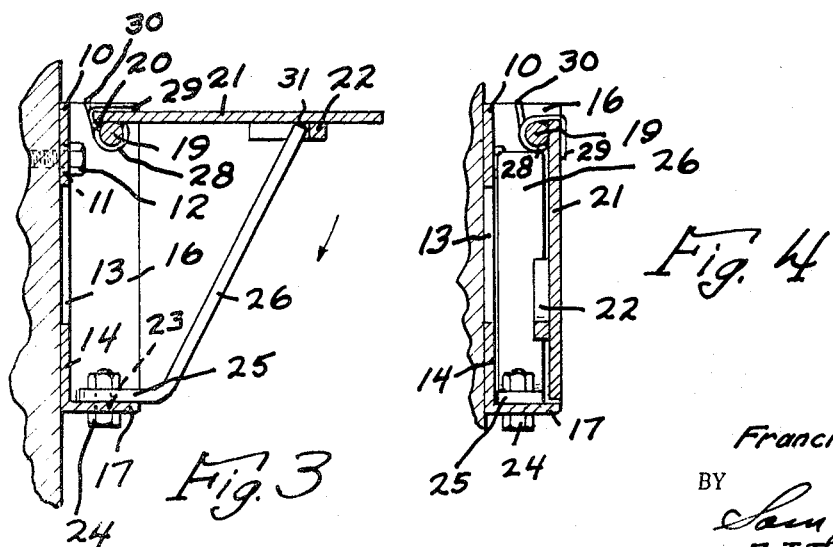
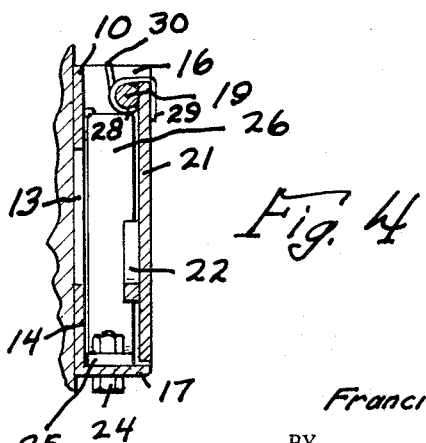
INVENTOR.
Francis H. Peck
BY
Sam J. Slotsky
ATTORNEY

United States Patent Office 3,308,905
Patented Mar. 14, 1967

3,308,905
COLLAPSIBLE STEP
Francis H. Peck, 609 Superior St.,
Storm Lake, Iowa 50588
Filed Aug. 9, 1965, Ser. No. 478,167
1 Claim. (Cl. 182—89)

My invention relates to a collapsible step.

An object of my invention is to provide a step unit which can be attached to the side of a tractor or any other arrangement and which can be readily collapsed so that the step will not project unduly.

A further object of my invention is to provide a structure in which the step when in use is in a sturdy condition and will be securely held.

A further object of my invention is to provide a device of this character which can be made at a reasonable cost and which can be readily attached to any surface etc.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a plan view of the step in its open position.
FIGURE 2 is a forward elevation of FIGURE 1.
FIGURE 3 is a sectional view taken along the lines 3—3 of FIGURE 2, and
FIGURE 4 is a similar section showing the step in its collapsed position.

My invention contemplates the provision of a step structure which will be securely held so that when stepped upon it will not become dislodged and which can be readily collapsed at any time so as not to project outwardly, thereby rendering a tractor, boat or other arrangement of a minimum lateral width for various purposes, such as in the case of tractors for instance, allowing a tractor to go through a narrow gateway without the step or steps extending beyond the tractor.

In describing my invention I have used the character 10 to designate a strap or plate having a pair of openings 11 therein and passing through the openings 11 are the bolts 12 which can be in the nature of cap screws, bolts or any other type of attaching devices.

Extending from the member 10 are the vertically positioned portions 13 which extend into the further portion 14 which is parallel to the member 10, and extending from the members 13 are the flanges 15 and 16 which merge with the horizontal flange 17 which extends from the member 14.

The flanges 15 and 16 include the openings 18 and passing through these openings 18 is a round bar 19 and welded at 20 to the bar 19 is the flat step member 21 to which is attached a further substantially U-shaped member 22.

The lower flange 17 includes an opening at 23 which receives a bolt 24 which passes through a strap member 25 which is bent into the upper inclined portion 26. The bolt 24 is loosely fitted so that the member 25, 26 can be pivoted to the dotted position as shown in FIGURE 2 and in the direction of the arrow 27.

Receiving the rod or bar 19 is a coiled helical spring 28 having a portion 29 bearing against the step member 21, and with a further portion 30 receiving the upper edge of the flange 16.

The step is used in the following manner. In normal use, or when the step is in operative position, it will appear as shown in FIGURES 1 to 3 inclusive, in which case the member 25, 26 is swung around to the position shown, and with the end 31 of the portion 26 being secured within the U-shaped boss 22 whereby the step will then be in secure position since the end 31 will be locked in place against lateral movement, etc.

When it is desired to collapse the step, the step member 21 is raised slightly until the U-shaped member 22 clears the upper end 31, and the member 25, 26 is then rotated about the bolt 24, and as explained in the direction of the arrow 27, until it will occupy the dotted position shown in FIGURE 2, and the step member 21 is released, whereby the spring 28 will force the member 21 to the vertical position shown in FIGURE 4, this position requiring very little space, and so that the vehicle to which the step is attached can pass through a gateway, etc.

These units can be made of any length or width and can be used on both sides of the vehicle, it being apparent that my invention thereby provides the advantages mentioned in the objects of my invention.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A collapsible step comprising a framework, a step member pivoted to said framework, means for supporting said step member in horizontal position including a bar pivoted to a lower portion of said framework and adapted to engage said step, a boss attached to said step member having a cavity therein, the upper end of said bar being adapted to be received in said cavity, a rod attached to said step member, said rod being journalled in said framework, a helical spring receiving said rod and bearing against said step member and said framework, said framework including an upper horizontal portion, a lower horizontal portion vertically spaced therefrom, horizontally spaced vertical portions merging with said horizontal portions, vertical flanges attached to said vertical portions in which said rod is journalled, a horizontal flange attached to said lower horizontal portion, said bar having a horizontal lower end portion and an upwardly inclined integral portion, a bolt passing through said horizontal lower end portion and said horizontal flange, swinging of said upwardly inclined portion away from said boss providing means whereby said step member will be spring urged to a vertical position and to be enclosed in said framework, means for attaching said upper horizontal portion to a body to which said framework is attached.

References Cited by the Examiner
UNITED STATES PATENTS

| | | | |
|---|---|---|---|
| 290,789 | 12/1883 | Nagele | 108—78 |
| 2,670,968 | 3/1954 | Duffy | 182—89 |
| 3,136,386 | 6/1964 | Horvath | 182—77 |

REINALDO P. MACHADO, *Primary Examiner.*